US010810135B2

(12) United States Patent
Chen et al.

(10) Patent No.: US 10,810,135 B2
(45) Date of Patent: Oct. 20, 2020

(54) DATA TRANSMISSION METHOD, APPARATUS, DEVICE, AND SYSTEM

(71) Applicant: Huawei Technologies Co., Ltd., Shenzhen (CN)

(72) Inventors: Hao Chen, Shenzhen (CN); Sicong Li, Hangzhou (CN); Yajun Chen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/523,771

(22) Filed: Jul. 26, 2019

(65) Prior Publication Data

US 2019/0347212 A1 Nov. 14, 2019

Related U.S. Application Data

(63) Continuation of application No. PCT/CN2018/073074, filed on Jan. 17, 2018.

(30) Foreign Application Priority Data

Jan. 26, 2017 (CN) .......................... 2017 1 0061693

(51) Int. Cl.
*G06F 12/1081* (2016.01)
*G06F 13/42* (2006.01)
(52) U.S. Cl.
CPC ...... *G06F 12/1081* (2013.01); *G06F 13/4221* (2013.01); *G06F 2213/0026* (2013.01)
(58) Field of Classification Search
CPC .................................................. G06F 9/45558
See application file for complete search history.

(56) References Cited

U.S. PATENT DOCUMENTS 9,008,809 B2* 4/2015 Tournier .................. G05B 9/03
700/82
2004/0172494 A1 9/2004 Pettey et al.
(Continued)

FOREIGN PATENT DOCUMENTS

CN 1794214 A 6/2006
CN 101261611 A 9/2008
(Continued)

OTHER PUBLICATIONS

Machine Translation and Abstract of Chinese Publication No. CN1794214, dated Jun. 28, 2006, 15 pages.
(Continued)

*Primary Examiner* — Henry Tsai
*Assistant Examiner* — Juanito Borromeo
(74) *Attorney, Agent, or Firm* — Conley Rose, P.C.

(57) ABSTRACT

In a data transmission method, an SoC obtains a first request, where the first request includes a first address of a storage medium and an operation type, and the first address is an address assigned by a processor to the storage medium in a memory address managed by the processor; determines a second address according to the first address and generating a second request message, where the second address is an address assigned by the SoC to the storage medium in a memory address managed by the SoC; and sends first control instruction to a DMA controller of the storage medium according to the second address, where the first control instruction is used to instruct the DMA controller to obtain the second request message.

20 Claims, 13 Drawing Sheets

(56) References Cited

U.S. PATENT DOCUMENTS

| | | |
|---|---|---|
| 2013/0007483 A1 | 1/2013 | Diefenbaugh et al. |
| 2014/0365704 A1 | 12/2014 | Yousuf |
| 2015/0143014 A1 | 5/2015 | Quach et al. |
| 2015/0347339 A1 | 12/2015 | Shao |
| 2016/0343429 A1 | 11/2016 | Nieuwejaar et al. |
| 2017/0262336 A1 | 9/2017 | Tabrizi et al. |

FOREIGN PATENT DOCUMENTS

| | | | |
|---|---|---|---|
| CN | 101266585 | A | 9/2008 |
| CN | 103403667 | A | 11/2013 |
| CN | 105359120 | A | 2/2016 |
| CN | 105359124 | A | 2/2016 |
| CN | 105468293 | A | 4/2016 |
| CN | 105765548 | A | 7/2016 |
| CN | 106168925 | A | 11/2016 |
| EP | 2863315 | A1 | 4/2015 |
| EP | 2927812 | A1 | 10/2015 |
| WO | 2013048477 | A1 | 4/2013 |
| WO | 2015180513 | A1 | 12/2015 |

OTHER PUBLICATIONS

Machine Translation and Abstract of Chinese Publication No. CN101261611, dated Sep. 10, 2008, 15 pages.

Machine Translation and Abstract of Chinese Publication No. CN101266585, dated Sep. 17, 2008, 11 pages.

Machine Translation and Abstract of Chinese Publication No. CN103403667, dated Nov. 20, 2013, 27 pages.

Machine Translation and Abstract of International Publication No. WO2015180513, dated Dec. 3, 2015, 22 pages.

Foreign Communication From A Counterpart Application, Chinese Application No. 201710061693.9, Chinese Office Action dated Aug. 1, 2019, 13 pages.

Foreign Communication From A Counterpart Application, PCT Application No. PCT/CN2018/073074, English Translation of International Search Report dated Apr. 17, 2018, 2 pages.

Foreign Communication From A Counterpart Application, PCT Application No. PCT/CN2018/073074, English Translation of Written Opinion dated Apr. 17, 2018, 5 pages.

* cited by examiner

DATA TRANSMISSION METHOD, APPARATUS, DEVICE, AND SYSTEM

CROSS-REFERENCE TO RELATED APPLICATIONS

This application is a continuation of Int'l Patent. App. No. PCT/CN2018/073074 filed on Jan. 17, 2018, which claims priority to Chinese Patent App. No. 201710061693.9 filed on Jan. 26, 2017, which are incorporated by reference.

TECHNICAL FIELD

Embodiments of the present application relate to the storage field, and in particular, to a data transmission method, an apparatus, a device, and a system.

BACKGROUND

New applications such as cloud computing, big data, distributed systems, machine learning, cognitive computing, augmented reality (AR), and virtual reality (VR) have resulted in an increasingly high demand for a computing system. Various new integrated infrastructures impose a higher requirement for performance and data exchange of the converged infrastructures. An integrated infrastructure means that basic elements of data centers, such as a server, a storage device, a network device, and virtualization software are pre-integrated to provide users with a computing resource (for example, a CPU (central processing unit) and a memory), a storage resource (for example, a magnetic disk), and a network resource (for example, a network adapter), to meet a service requirement of the users.

Currently, the data exchange of the converged infrastructures is in a manner of direct memory access (DMA) transmission. In a data transmission solution shown in FIG. 1, for example, a processor needs to write to-be-written data to a storage medium. First, the processor sends, to a system on chip (SoC), a control instruction used to instruct the SoC to migrate the to-be-written data to the SoC. Then, a DMA controller of the SoC migrates the to-be-written data from a double data rate (DDR) synchronous dynamic random access memory of the processor to a DDR of the SoC based on the control instruction. Next, the SoC sends a write data instruction to the storage medium. The storage medium shown in FIG. 1 may be a non-volatile memory express (NVMe) SSD. Then, a DMA controller of the SSD migrates the to-be-written data from the DDR of the SoC to the storage medium (for example, the SSD). A process in which the processor reads to-be-read data in the storage medium is similar to a process in which the processor writes the to-be-written data to the storage medium, and one read operation processing process also requires two DMA processing processes.

In the solution described in FIG. 1, in data transmission processes of the processor and the storage medium, two DMA migrations need to be performed. In this way, when a plurality of storage media exist, the SoC needs to simultaneously process DMA migration requests of the plurality of storage media, resulting in more SoC CPU computing resources and storage or memory resources consumed to participate in DMA migration, low data transmission efficiency, and a long delay.

SUMMARY

This application provides a data transmission method, an apparatus, a device, and a system, to resolve problems of a long delay and low transmission efficiency caused by two DMA migrations, of an SoC and a storage medium, required during one time of data transmission in an existing converged infrastructure data exchange scenario.

To achieve the foregoing objective, this application uses the following technical solutions.

According to a first aspect, this application provides a data transmission method, where the method is applied to a storage system, the storage system includes a processor, a system on chip SoC, and a storage medium, the processor, the SoC, and the storage medium communicate with each other by using an extended Peripheral Component Interconnect Express (PCIe) bus, and the storage medium includes a direct memory access DMA controller. The method includes: obtaining, by the SoC, a first request message including an operation type and a first address of a storage medium in which to-be-operated data is located, where the operation type includes a read operation or a write operation, and the first address is an address assigned by the processor to the storage medium in a memory address managed by the processor; determining, by the SoC based on a preset address mapping relationship and the first address, a second address assigned to the storage medium in a memory address managed by the SoC; then sending, by the SoC, a first control instruction to the DMA controller of the storage medium, where the first control instruction is used to instruct the DMA controller to obtain a second request message carrying the second address and the operation type; and receiving, by the SoC when the operation type is a read operation, first data sent by the DAM controller, and sending, by the SoC, the first data to the processor, where the first data is obtained by the DMA controller according to the second address; or receiving, by the SoC when the operation type is a write operation, second data sent by the processor and sending the second data to the DMA controller, to trigger the DMA controller to write the second data to the storage medium according to the second address.

This application provides the data transmission method. The SoC obtains the first request message from the processor by using the first control instruction, translates the first address carried in the first request message into the second address, and then sends a second control instruction to a target storage medium, where the second control instruction includes the second request message carrying the second address and the operation type. Therefore, in a transmission process of target data from the processor to the target storage medium, the SoC is responsible for translating the first address into the second address, and forwarding to-be-read first data or to-be-written second data between the processor and the storage medium. The data transmission process only requires participation of the DMA controller of the storage medium, and does not require participation of a DMA controller of the SoC. Therefore, in this embodiment of the present application, the first data or the second data is migrated between the processor and the storage medium only by using the DMA controller of the storage medium, so as to avoid problems of a long delay and low transmission efficiency caused by using the DMA controller of the SoC to forward the data during data transmission.

In a possible implementation of the first aspect, before the obtaining, by the SoC, a first request message, the method provided in this application further includes: receiving, by the SoC, the second control instruction sent by the processor, where the second control instruction carries an identifier used to uniquely identify the first request message; and obtaining the first request message based on the identifier of the first request message.

In a possible implementation of the first aspect, the determining, by the SoC, a second address based on the first address includes: obtaining the second address corresponding to the first address from a preset address mapping table according to the first address, where the preset address mapping table includes a mapping relationship between an address assigned to the storage medium in the memory address managed by the processor and an address assigned to the storage medium in the memory address managed by the SoC; and determining the address corresponding to the first address as the second address of the storage medium.

In a possible implementation of the first aspect, the receiving, by the SoC when the operation type is a read operation, first data sent by the DAM controller, and sending the first data to the processor includes: receiving, by the SoC, the first data sent by the DMA controller; mapping the second address of the storage medium to the first address according to the preset address mapping table; and forwarding the first data to the processor according to the first address.

In a possible implementation of the first aspect, the SoC receives a first interrupt sent by the DMA controller, where the first interrupt is used to indicate that the DMA controller has successfully transmitted the first data to the SoC. When determining that the SoC successfully transmits the first data to the processor according to the first address, the SoC sends a second interrupt to the processor, where the second interrupt is used to indicate that the SoC successfully forwards the first data to the processor.

In a possible implementation of the first aspect, the receiving, by the SoC when the operation type is a write operation request, second data sent by the processor and sending the second data to the DMA controller, to trigger the DMA controller to write the second data to the storage medium according to the second address includes: receiving, by the SoC, the second data sent by the processor, mapping the first address of the storage medium to the second address, and sending the second data to the DMA controller according to the second address.

In a possible implementation of the first aspect, before the receiving, by the SoC, second data sent by the processor, the method further includes: receiving, by the SoC, a read request message sent by the DMA controller, where the request message carries the second address; mapping the second address in the read request message to the first address, and generating a third request message, where the third request message is used to instruct the processor to send the to-be-written data to the SoC; and sending the third request message to the processor.

According to a second aspect, an embodiment of this application provides a storage system, where the storage system includes a processor, a system on chip SoC, and a storage medium; the processor, the SoC, and the storage medium communicate with each other by using an extended PCIe bus, and the storage medium includes a direct memory access DMA controller. The processor is configured to send, to the SoC, a first control instruction used to obtain a first request message, where the first control instruction carries an identifier used to uniquely identify the first request message, the first request message includes a first address of the storage medium and an operation type, and the first address is an address assigned to the storage medium in a memory address managed by the processor. The SoC is configured to: receive the first control instruction sent by the processor, and obtain the first request message based on the first control instruction; determine a second address based on the first address and generate a second request message, where the second address is an address assigned to the storage medium in a memory address managed by the SoC, and the second request message carries the second address and the operation type; send the first control instruction to the DMA controller of the storage medium according to the second address, where the first control instruction is used to instruct the DMA controller to obtain the second request message; and when the operation type is a read operation, receive first data sent by the DAM controller, and send the first data to the processor, where the first data is obtained by the DMA controller according to the second address; or when the operation type is a write operation, receive second data sent by the processor, and send the second data to the DMA controller to trigger the DMA controller to write the second data to the storage medium according to the second address. The DMA controller of the storage medium is configured to: receive a second control instruction, where the second control instruction carries the identifier used to uniquely identify the first request message; obtain the second request message based on the second control instruction; and when the operation type is a read operation, obtain the first data according to the second address, and send the first data to the SoC; or when the operation type is a write operation, receive the second data sent by the SoC, and write the second data to the storage medium according to the second address.

According to a third aspect, this application provides a system on chip SoC, where the SoC includes modules configured to perform the data transmission method in the first aspect or any one of the possible implementations of the first aspect.

According to a fourth aspect, this application provides a system on chip SoC, where the SoC includes a processor, a memory, a communications interface, and a bus; the processor, the memory, and the communications interface are connected by using the bus to implement mutual communication; the memory is configured to store a computer execution instruction; and when the SoC runs, the processor executes the computer execution instruction in the memory to perform, by using a hardware resource in the SoC, the data transmission method described in the first aspect or any one of the possible implementations of the first aspect.

According to a fifth aspect, this application provides a non-transitory computer-readable storage medium, and the computer readable storage medium stores an instruction. When the instruction is run on a computer, the computer performs the methods in the foregoing aspects.

Based on the implementations provided in the foregoing aspects, this application may further provide more implementations through combination.

BRIEF DESCRIPTION OF DRAWINGS

To describe the technical solutions in the embodiments of the present application more clearly, the following briefly describes the accompanying drawings.

DESCRIPTION OF EMBODIMENTS

The following describes the embodiments of the present application in detail with reference to accompanying drawings. To clearly describe the technical solutions in the embodiments of the present application, the terms "first", "second", and the like in the embodiments of the present application are used to distinguish between same items or similar items whose functions and actions are basically the same, and a person skilled in the art may understand that the terms "first" "second", and the like do not limit a quantity and an execution order.

Figure 1:
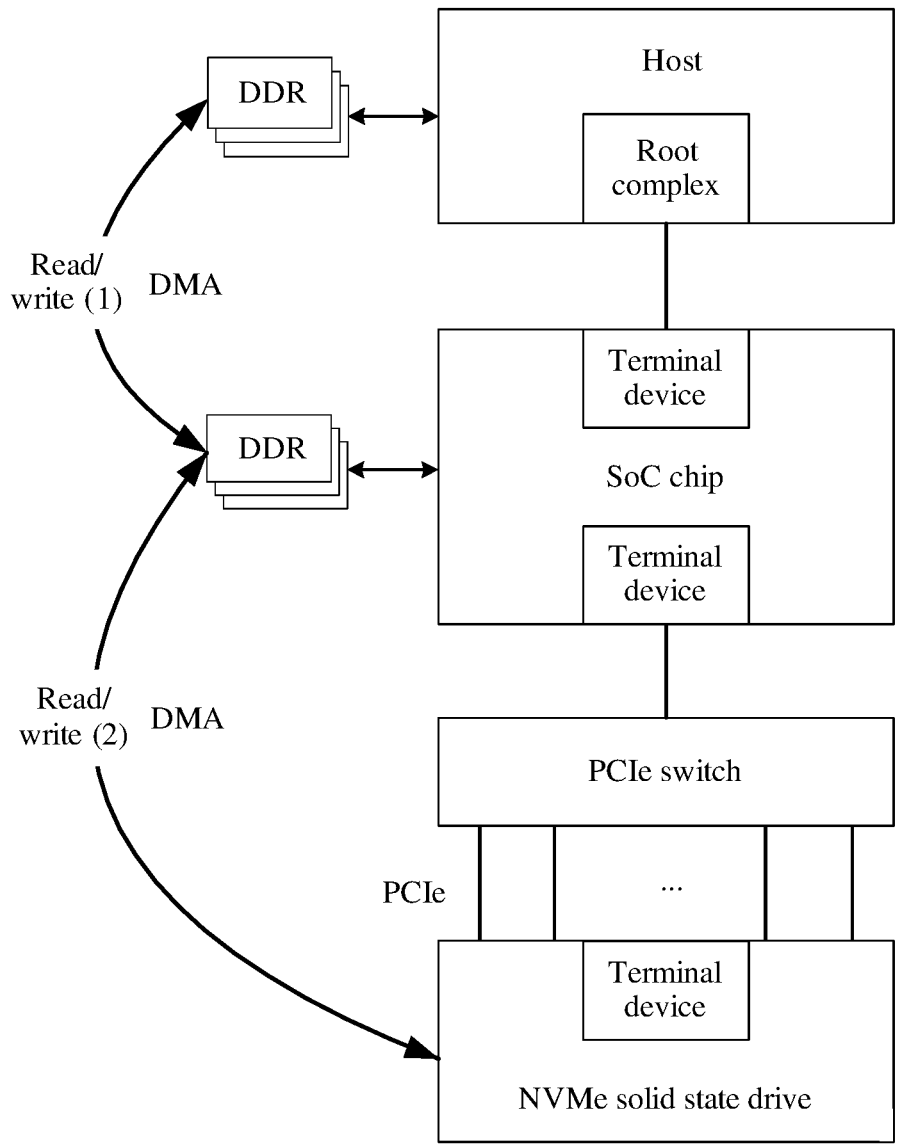
FIG. 1 is a schematic diagram of data transmission.
Figure 2A:
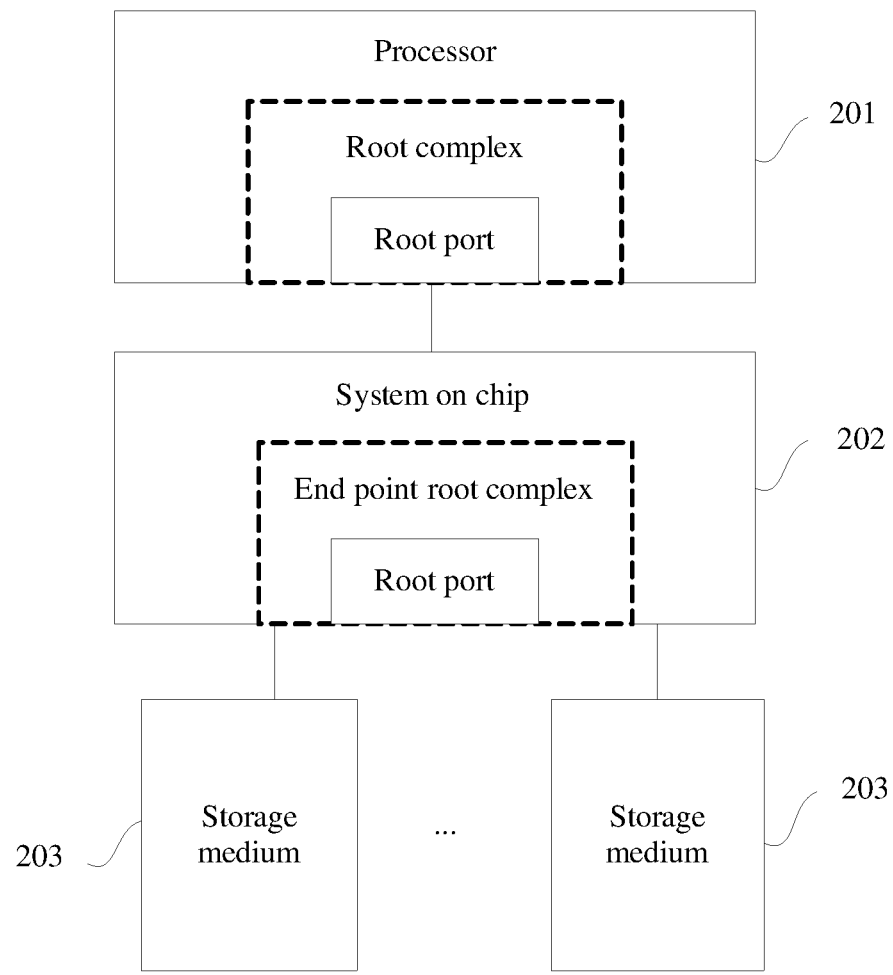
FIG. 2A is an architectural diagram of a storage system according to an embodiment of the present application.

FIG. 2A is an architectural diagram of a storage system to which a data transmission method according to an embodiment of the present application is applied. As shown in FIG. 2A, the storage system includes a processor 201, an SoC 202, and a storage medium 203. A DDR synchronous dynamic random access memory is disposed on both the processor and the SoC, which is not shown in FIG. 2A. The processor 201, the system on chip 202, a DDR 204, and the storage medium 203 are interconnected by using a PCIe bus. The processor 201 includes a root complex (RC). The RC is a management module configured to manage an access device in the PCIe bus. The root complex connects to the SoC by using a root port (RP). The SoC serves as one end point (EP) device of the processor 201 to access a PCIe bus structure. A redundant array of independent disks (RAID) controller runs on the SoC, and is configured to manage the storage medium 203. The storage medium 203 is configured to store to-be-read data or to-be-written data.

It should be noted that in FIG. 2A, there may be one or more processors 201, and there may also be one or more storage media 203.

A person skilled in the art should understand that in a PCIe bus standard, a device in each PCIe bus needs a unique bus number identifier, and each PCIe structure is limited by a limited resource, for example, a PCIe bus structure supports a maximum of 256 bus numbers. In the PCIe structure, an end point root complex may be established in an end point device (for example, the SoC). The end point root complex is a management module, in the extended PCIe structure, configured to manage an access device accessing the extended PCIe structure. The SoC connects to the storage medium 203 by using an RP of the end point root complex. Each storage medium 203 serves as one end point device in the extended PCIe structure to access the PCIe bus, so as to extend a quantity of end point devices in the PCIe structure. In addition, the storage medium 203 may be an NVMe SSD or may be another type of storage medium. A DMA controller runs in each storage medium 203. The DMA controller is configured to directly migrate to-be-read data from a storage medium to a DDR corresponding to the processor, and the processor 201 does not need to participate.

The root complex of the processor 201 further maps various apparatuses (including a storage location of the apparatus, for example, a register and a storage location) connected to the processor to a PCIe storage space, namely, to a system memory. These types of mapping and storage spaces are referred to as memory mapped input/output (MMIO) spaces. Similarly, the end point root complex of the SoC also maps apparatuses (for example, a register and a storage medium) connected to the SoC to the PCIe storage space. A memory space managed by the root complex of the processor 201 and a memory space managed by the end point root complex of the SoC are mutually independent. There is a preset address mapping relationship between the two memory spaces, and the preset address mapping relationship is stored on the SoC. When the processor receives a read operation request message or a write operation request message, the root complex of the processor may determine a storage location of a storage medium based on address information carried in the request message. Then, the end point root complex of the SoC determines, based on the preset address mapping relationship, address information of the storage medium in a memory managed by the SoC, namely, a storage location of the storage medium in a PCIe structure of the end point root complex of the SoC. Finally, a DMA controller of the storage medium performs data processing.

For example, a memory space managed by the processor 201 is 8 TB. An address of the memory space ranges from 00000000000 to 7ffffffffff (equivalent to 0 TB to 8 TB). A size of a memory allocated by the processor 201 to the SoC 202 in the memory space managed by the processor 201 is 4 TB. An address of the 4 TB memory allocated by the processor 201 to the SoC 202 ranges from 3ffffffffff to 7ffffffffff (equivalent to 4 TB to 8 TB). A memory space managed by the SoC 202 is 6 TB. An address of the memory space managed by the SoC ranges from 00000000000 to 5ffffffffff (equivalent to 0 TB to 6 TB). A size of a memory allocated to the storage medium 203 in the memory space of the SoC 202 is also 4 TB, and an address ranges from 1ffffffffff to 5ffffffffff (equivalent to 2 TB to 6 TB). Therefore, to map the 4 TB of the storage medium 203 on the SoC 202 to the 4 TB of the processor 201, address mapping translation is used, for example, an address 1ffffffffff of the SoC 202 is mapped to an address 3ffffffffff of the processor 201.

In addition, a submission queue (SQ) and a completion queue (CQ) are stored in the processor 201, the SoC 202, and the storage medium 203. The submission queue is used to store a to-be-processed read operation request message or write operation request message. The CQ is used to store a completed read operation request message or write operation request message.

Specifically, an SQ of the processor 201 stores a read operation request message or a write operation request message to be processed by the processor 201. A CQ of the processor 201 stores a read operation request message or a write operation request message completed by the processor 201. In addition, both the read operation request message and the write operation request message stored in the SQ and the CQ of the processor 201 carry a first address. The first address is an address that is assigned to a storage medium storing to-be-read or to-be-written data and that is in a memory address managed by the processor. An SQ of the SoC 202 stores a read operation request message or a write operation request message to be processed by the SoC 202. A CQ of the SoC 202 stores a read operation request message or a write operation request message completed by the SoC 202. In addition, both the read operation request message and the write operation request message stored in the SQ and the CQ of the SoC carry a second address. The second address is an address that is assigned to a storage medium storing to-be-read or to-be-written data and that is in a memory address managed by the SoC. An SQ of the storage medium 203 stores a read operation request message or a write operation request message to be processed by the storage medium 203. A CQ of the storage medium 203 stores a read operation request message or a write operation request message completed by the storage medium 203.

Figure 2B:
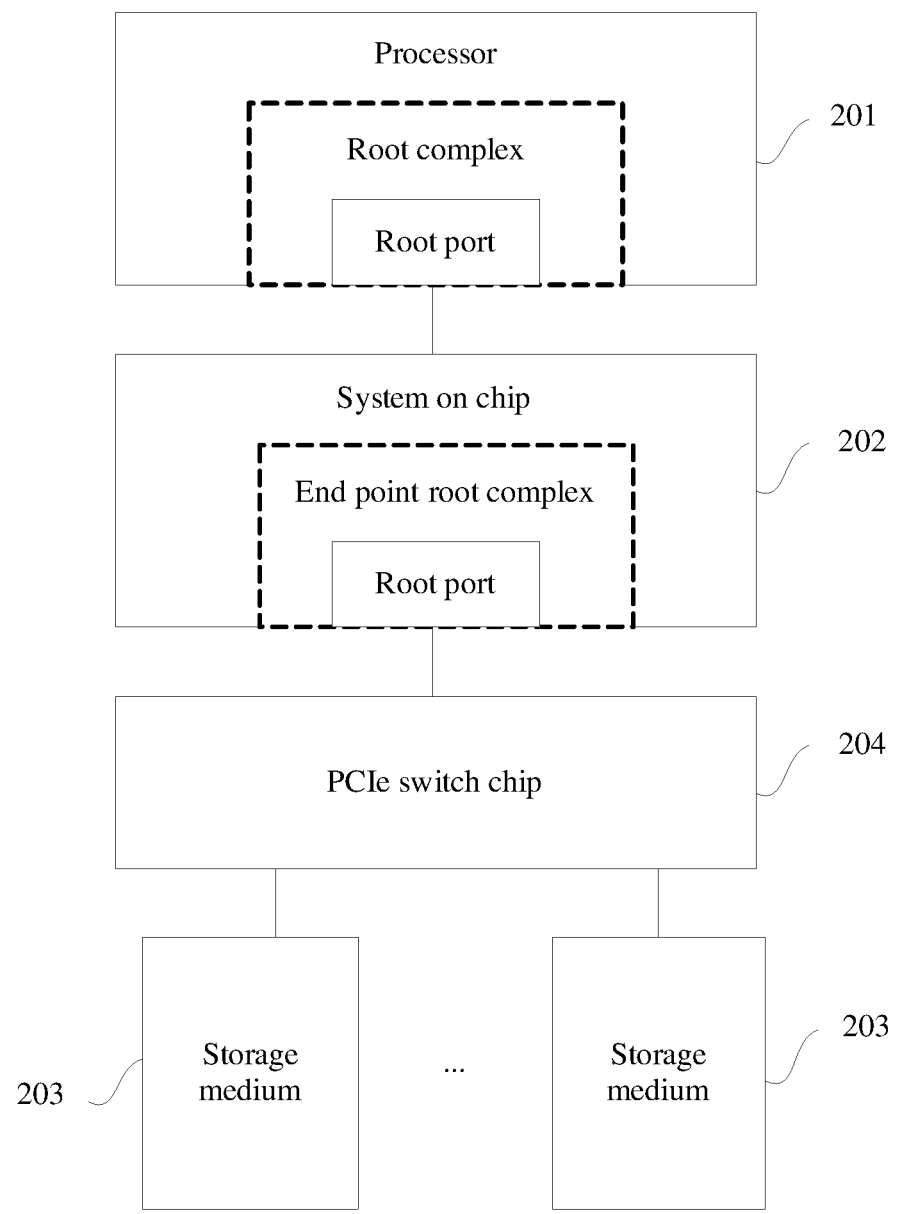
FIG. 2B is an architectural diagram of another storage system according to an embodiment of the present application.

FIG. 2B is another architectural diagram of a storage system to which a data transmission method according to an embodiment of the present application is applied. As shown in FIG. 2B, functions of a processor 201, an SoC 202, and a storage medium 203 in FIG. 2B are the same as those in FIG. 2A. Details are not described herein again in this application. A difference between FIG. 2B and FIG. 2A lies in that, in FIG. 2A, each storage medium 203 is used as one EP and directly connects to the PCIe bus by using one RP on the SoC; however, in FIG. 2B, the SoC 202 connects to the storage medium 203 by using a PCIe switch chip 204. Specifically, the PCIe switch chip 204 includes at least one uplink port and at least one downlink port. The uplink port of the PCIe switch chip 204 is configured to connect to an RP on the SoC 202, and the downlink port is configured to connect to the storage medium 203. The uplink port is a port that points to a root complex, and the downlink port is a port far away from the root complex. In FIG. 2B, the root complex includes only one root port. It may be understood that, in an actual use process, the root complex includes a plurality of root ports (for example, between four and six root ports).

It should be noted that in FIG. 2B, there may be one or more processors 201, and there may also be one or more storage media 203.

Optionally, as shown in FIG. 2B, in the storage architecture applied to this embodiment of the present application, the PCIe switch chip 204 is used to connect to the storage medium. In addition, an interface card may be further used to externally connect to another storage medium. In this case, the storage architecture shown in FIG. 2B may be applied to a network-based storage system of a non-volatile memory express of fabric (NoF).

Storage system architectures shown in FIG. 2A and FIG. 2B in the embodiments of the present application may be a storage array. The storage array includes a controller and a disk enclosure. The controller runs on the processor 201. The storage medium 203 may be a hard disk device in a same physical device as the controller in the storage array, or may be a storage array connected, in a form of a disk enclosure, to a physical device on which the controller is located. The storage array further includes a RAID controller. The RAID controller runs on the SoC 202. The RAID controller is configured to manage a RAID relationship of a storage medium in the storage array.

Optionally, the storage system architectures shown in FIG. 2A and FIG. 2B in the embodiments of the present application may alternatively be a server. The server includes a processor 201, an SoC 202, and a storage medium 203.

With reference to FIG. 2A and FIG. 2B, any one of storage media 203 in the embodiments of the present application may receive, by using the SoC 202, a read operation request message or a write operation request message sent by one or more processors 201, and store, in the storage medium 203, to-be-written data requested in the write operation request message sent by the one or more processors 201. In addition, any one of the storage media 203 may further return, to the processor 201 based on a read operation request message sent by the processor 201, data to be read by the processor 201 from the storage medium 203, and the data is stored in a DDR 20 of the processor 201.

Figure 3:
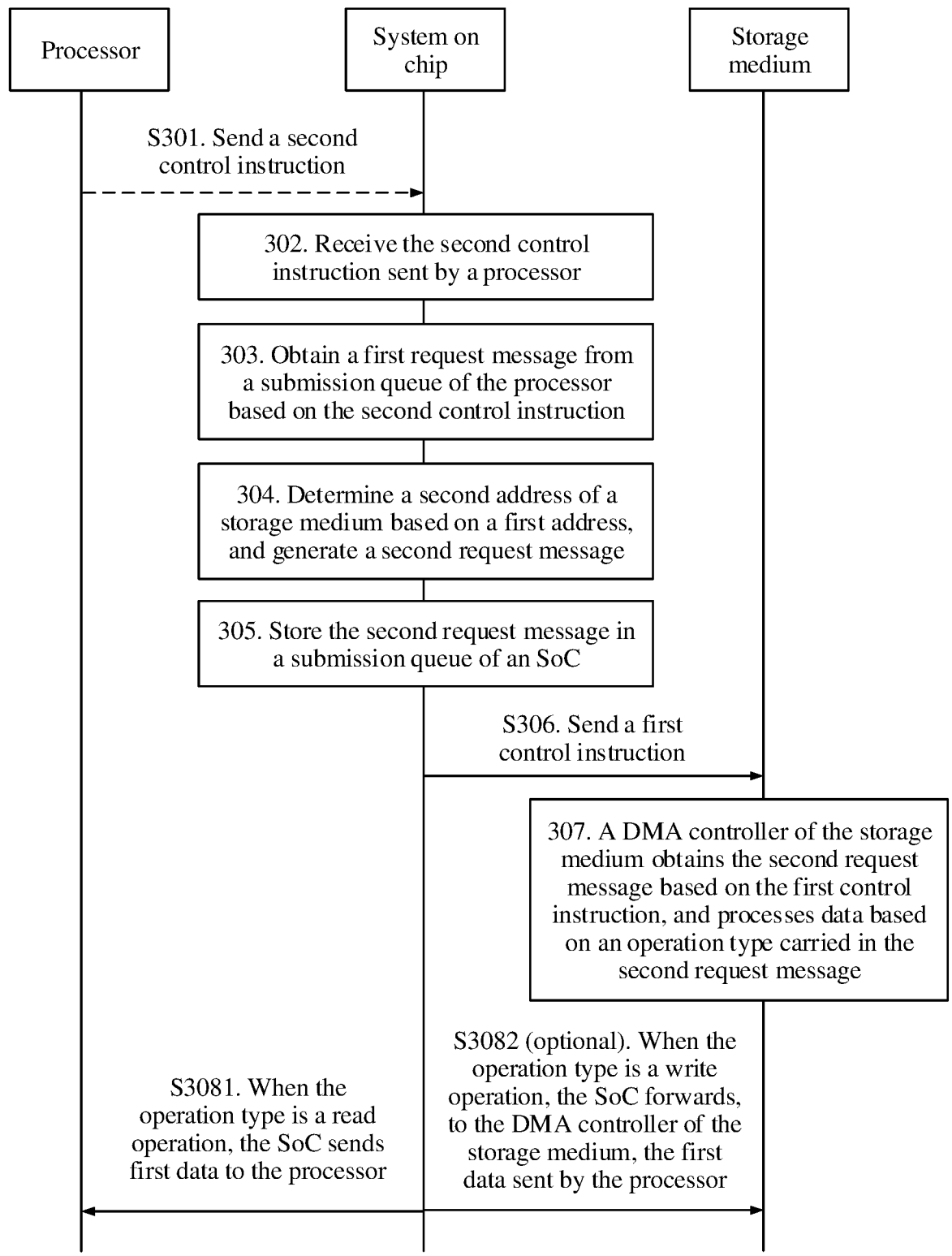
FIG. 3 is a schematic flowchart of a data transmission method according to an embodiment of the present application.

The following further describes a data transmission method according to an embodiment of the present application with reference to FIG. 3. The method is applied to the storage system shown in FIG. 2A or FIG. 2B. As shown in FIG. 3, the method provided in this embodiment of the present application includes the following steps.

S301. A processor sends a second control instruction to an SoC.

Specifically, the second control instruction is used to instruct the SoC to obtain a first request message from a submission queue of the processor. The first request message includes a first address of a storage medium and an operation type. The storage medium is configured to store to-be-read or to-be-written data. The first address is an address assigned to the storage medium in a memory address managed by the processor. The operation type includes a read operation or a write operation.

Optionally, the second control instruction includes a first identifier. The first identifier is used to uniquely identify one first request message.

It may be understood that the submission queue stored in the processor includes at least one request message. Each request message indicates one read operation request message or write operation request message to be processed by the processor. Each request message is corresponding to one identifier. As shown in Table 1, a unique identifier of a first request message 1 is 1001, a unique identifier of a first request message 2 is 1002, and a unique identifier of a first request message 3 is 1003.

TABLE 1

Example of a correspondence between a first request message and a first identifier in the processor

| First identifier | First request message |
| --- | --- |
| 1001 | First request message 1 |
| 1002 | First request message 2 |
| 1003 | First request message 3 |

For example, if the first request message is the first request message 1, and the unique identifier of the first request message 1 is 1001, the SoC obtains a request message 1 corresponding to 1001 from the submission queue of the processor according to the identifier.

S302. The SoC receives the second control instruction sent by the processor.

S303. The SoC obtains a first request message from a submission queue of the processor based on the second control instruction.

Specifically, the second control instruction carries the first identifier of the first request message. The SoC obtains the first request message corresponding to the first identifier from the submission queue of the processor according to the first identifier of the first request message.

It may be understood that there are a plurality of storage locations in the SQ queue of the processor. One storage location is used to store one first request message. After the SoC obtains the first request message corresponding to the first identifier from the SQ queue according to the first identifier, a storage space at a storage location of the first request message is vacated. When the processor generates a new first request message, the processor may store the newly generated first request message at the vacant storage location.

S304. The SoC determines a second address of a storage medium based on a first address, and generates a second request message.

Specifically, the second address is an address assigned to the storage medium in a memory address managed by the SoC.

In addition, the second request message carries the second address and the operation type. The second request message corresponds to one second identifier. The second request message is used to indicate that a DMA controller of the storage medium is to perform a read operation or a write operation on the storage medium corresponding to the second address based on the operation type. The operation type carried in the second request message is consistent with the operation type carried in the first request message. For example, if the operation type carried in the first request message is a write operation, the operation type carried in the second request message is also a write operation. If the operation type carried in the first request message is a read operation, the operation type carried in the second request message is also a read operation.

Optionally, step S304 in this embodiment of the present application may be implemented in the following manner:

S3041. The SoC obtains the second address corresponding to the first address from a preset address mapping table according to the first address.

The preset address mapping table includes a mapping relationship between the first address and the second address.

For example, the SoC stores a preset address mapping table. A specific mapping rule between the first address and the second address is established in the preset address mapping table. The SoC may determine, by using the mapping rule, the second address that has a mapping relationship with the first address. The first address is an address assigned to the storage medium in the memory address managed by the processor. The second address is an address assigned to a to-be-operated storage medium in the memory address managed by the SoC.

TABLE 2

Preset address mapping table

| First address | Second address |
|---|---|
| 100001 | 2000002 |
| 100011 | 200011 |
| 100012 | 200013 |

In Table 2, an address obtained in the first request message obtained by the SoC from the submission queue of the processor is denoted as the first address. If the first address carried in the first request message is 100001, the SoC may determine, by using the preset address mapping table, that the second address that has a mapping relationship with the first address 100001 is 2000002.

S305. The SoC stores the second request message in a submission queue of the SoC.

S306. The SoC sends a first control instruction to a DMA controller of the storage medium, where the first control instruction is used to instruct the DMA controller of the storage medium to obtain the second request message from the submission queue of the SoC.

Optionally, the first control instruction carries the second identifier. The second identifier is used to uniquely identify the second request message stored in the submission queue of the SoC.

The second identifier in this embodiment of the present application may be any identifier such as a letter or a number that can uniquely identify one second request message. This is not limited in this embodiment of the present application.

It may be understood that the submission queue of the SoC includes one or more storage locations. Each of the one or more storage locations is used to store one second request message; in other words, the submission queue of the SoC stores one or more second request messages. Each of the one or more second request messages carries one second address and an operation type. Each second request message is corresponding to one second identifier that uniquely identifies the second request message. As shown in Table 3, a unique identifier of a second request message 1 is 101, a unique identifier of a second request message 2 is 102, and a unique identifier of a second request message 3 is 103.

TABLE 3

Example of a correspondence between a second request message and an identifier in the submission queue of the SoC

| Second identifier | Second request message |
|---|---|
| 101 | Second request message 1 |
| 102 | Second request message 2 |
| 103 | Second request message 3 |

For example, when the second identifier carried in the first control instruction is 101, the second control instruction is used to instruct the DMA controller of the storage medium to obtain the second request message 1 corresponding to the second identifier 101 from the SoC submission queue.

It may be understood that after the DMA controller of the storage medium obtains the second request message from the submission queue of the SoC based on the first control instruction, a storage space at a storage location of the second request message is vacated. The SoC may store a new second request message at the vacant storage location.

S307. The DMA controller of the storage medium obtains the second request message based on the first control instruction, and processes data based on an operation type carried in the second request message.

Specifically, the DMA controller of the storage medium obtains the second request message corresponding to the second identifier from the submission queue of the SoC according to the second identifier carried in the first control instruction.

The operation type of the second request message may be a read operation or a write operation, and different operation types have different specific implementation processes. The following describes in detail specific implementation processes of step S307 separately with reference to two cases: The operation type is a read operation request, and the operation type is a write operation request.

On the one hand, when the operation type of the second request message is a read operation, with reference to FIG. 3, optionally, step S307 may be implemented in the following manner:

S3071A. The DMA controller of the storage medium obtains first data, stored in the storage medium, corresponding to the second address, where the first data is to-be-read data stored in the storage medium.

S3072A. The DMA controller of the storage medium sends the first data to the SoC in a DMA memory access manner, and then S3081 is performed.

On the other hand, when the operation type of the second request message is a write operation, the processor writes to-be-written data to the storage medium. However, for the storage medium, the storage medium requests to read the to-be-written data from the processor. Therefore, with reference to FIG. 3, step S307 may be implemented in the following manner.

S3071B. After obtaining the second request message, the DMA controller of the storage medium sends a read request message to the SoC, where the read request message carries the second address, the read request message is used to instruct to obtain second data, and the second data is data to be written to the storage medium.

S3072B. The DMA controller of the storage medium obtains the second data from the processor in a DMA memory access manner, and then S3082 is performed.

After step S307, the method further includes the following steps:

S3081. When the operation type is a read operation, the SoC sends the first data to the processor.

S3082. When the operation type is a write operation, the SoC forwards, to the DMA controller of the storage medium, the first data sent by the processor.

In the data transmission method provided in this embodiment of the present application, the SoC obtains the first request message from the processor by using the first control instruction, translates the first address carried in the first request message, and then sends the second control instruction to a target storage medium, so that the target storage medium obtains the second request message based on the second control instruction. Therefore, in a process of transmitting the first data or the second data from the processor to the storage medium, the SoC is responsible for translating the first address into the second address, and forwarding the first data or the second data between the processor and the storage medium. In addition, migration of the first data or the second data from the processor to the storage medium only requires participation of the DMA controller of the storage medium, and does not require participation of the DMA controller of the SoC. Therefore, in this embodiment of the present application, the first data or the second data is migrated between the processor and the storage medium only by using the DMA controller of the storage medium, so as to avoid problems of a long delay and low transmission efficiency caused by using the DMA controller of the SoC to forward the data during data transmission.

The operation type of the first request message obtained by the SoC from the SQ of the processor may be a read operation, or may be a write operation, and request messages of different operation types are different in a specific implementation process. Therefore, the following separately describes in detail interaction between the SoC and both of the processor and the target storage medium when the operation type is a read operation request or a write operation request.

To avoid problems of a delay and low transmission efficiency caused by participation of the DMA controller of the SoC in migration in a transmission process, of target data, between the processor and the storage medium, in this application, when the operation type is a read operation, to-be-read first data is migrated from the storage medium to the processor only by using the DMA controller of the storage medium. When the operation type is a write operation, to-be-written second data is migrated from the processor to the storage medium only by using the DMA controller of the storage medium. When the second data is transmitted from the storage medium to the processor, the second data is transmitted only through an internal bus of the SoC. The DMA controller of the SoC does not need to participate in migration. Therefore, a delay can be avoided.

Figure 4:
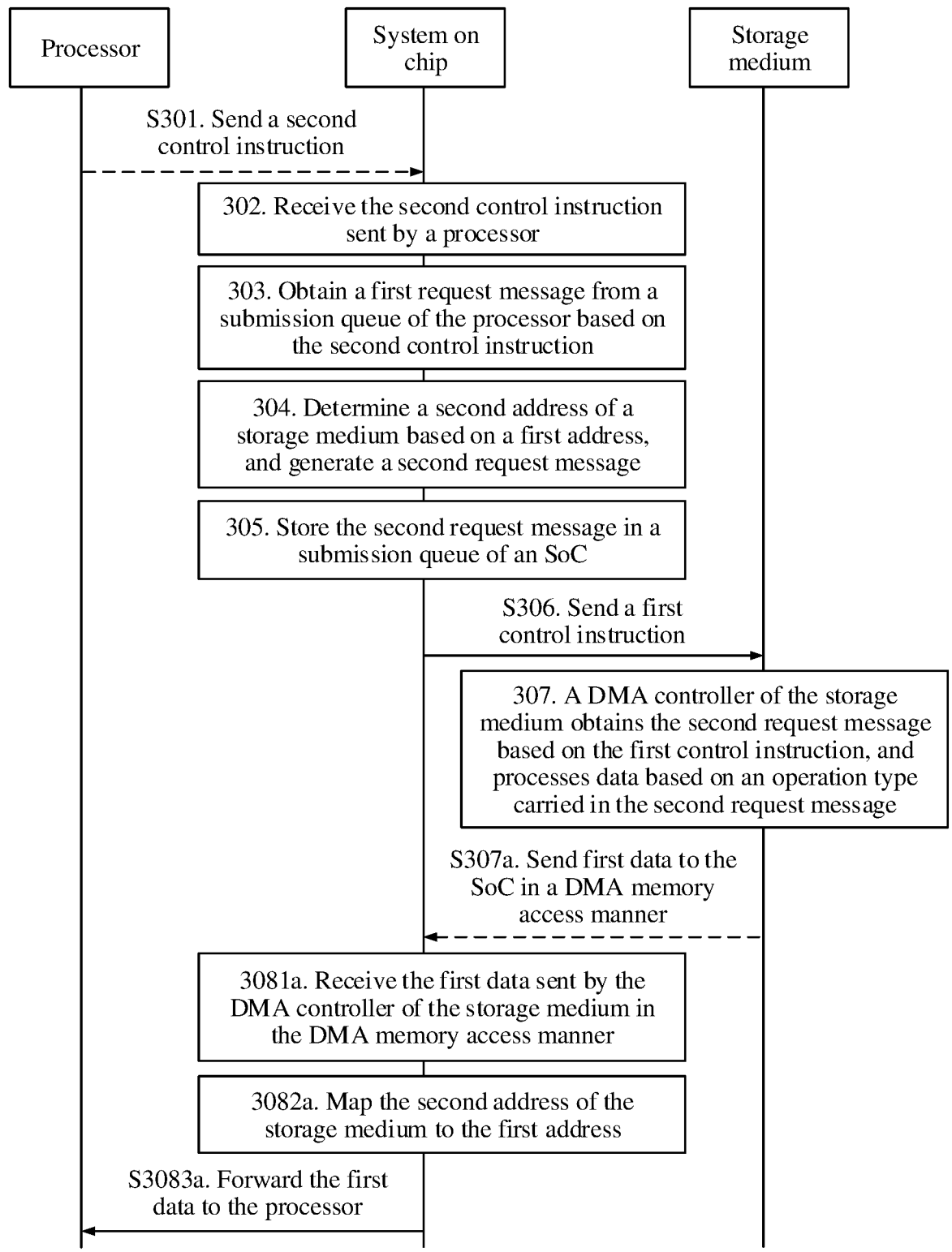
FIG. 4 is a schematic flowchart of another data transmission method according to an embodiment of the present application.

In a possible embodiment, with reference to FIG. 3, FIG. 4 is a data transmission process provided in the present application when the operation type is a read operation. A difference between FIG. 4 and FIG. 3 lies in that after execution of S301 to S307, a step in this embodiment of the present application further includes S307a. FIG. 4 describes in detail a data transmission process of step S308. For a processing process of steps S301 to S307, refer to FIG. 3. Details are not described again in this embodiment of the present application. As shown in FIG. 4, the method provided in this embodiment of the present application includes:

S307a. The DMA controller of the storage medium sends the first data to the SoC in a DMA memory access manner.

Optionally, as shown in FIG. 4, step S3081 may further include:

S3081a. The SoC receives the first data sent by the DMA controller of the storage medium in the DMA memory access manner.

S3082a. The SoC maps the second address of the storage medium to the first address.

Specifically, the SoC may map an address of target data from the second address to the first address by using the preset address mapping table shown in Table 2.

S3083a. The SoC forwards the first data to the processor.

Optionally, in a process of executing step S3081, the method provided in this embodiment of the present application further includes:

S3083a1. The SoC receives a first interrupt sent by the DMA controller of the storage medium, where the first interrupt is used to indicate that the DMA controller has successfully transmitted the first data to the SoC.

Specifically, a method for determining, by the DMA controller of the storage medium, that the first data is successfully forwarded to the processor may be understood as follows: An amount of data sent by the SoC to the processor is equal to a size of the first data. That is, if the size of the first data is A, and the SoC determines that the size of the first data that has been forwarded to the processor is also A, the target data is successfully forwarded.

Optionally, the DMA controller of the storage medium may further record the size and a check value of the first data, record and transmit location information of the first data in a pointer manner, and calculate a check value of the first data that has been sent. When the calculated check value of the first data that has been sent is equal to the recorded check value, the first data is successfully transmitted.

S3083a2. When determining that the SoC successfully transmits the first data to the processor, the SoC sends a second interrupt to the processor, where the second interrupt is used to indicate that the SoC successfully forwards the first data to the processor.

For a method for determining, by the SoC, whether the first data is successfully transmitted, refer to description of S3083a1. Details are not described herein again.

The DMA controller of the storage medium sends the first data to a memory of the SoC in a DMA memory access manner. The SoC sends the first data to the processor by using the PCIe bus.

Figure 5A:
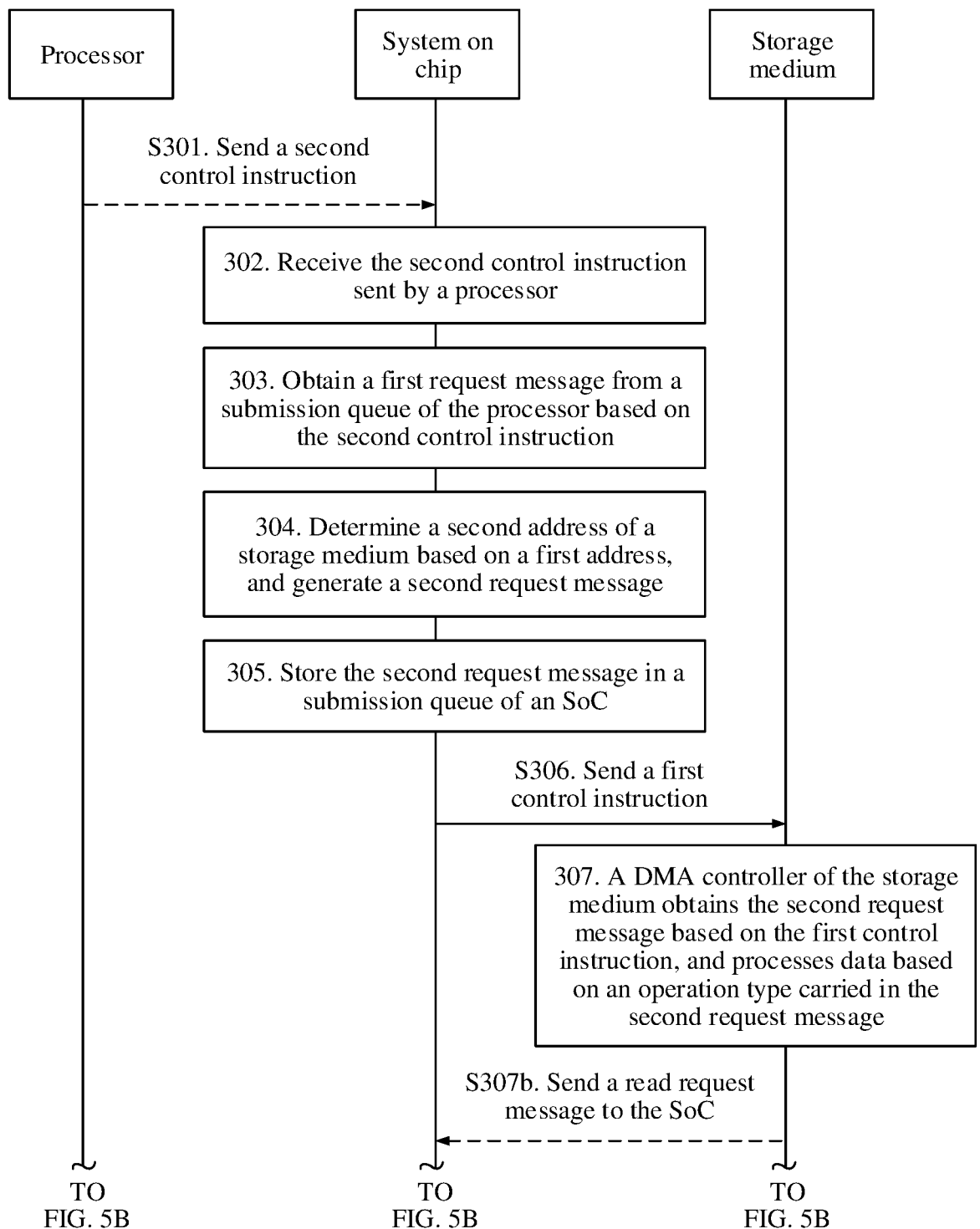
FIG. 5A and FIG. 5B are a schematic flowchart of another data transmission method according to an embodiment of the present application.
Figure 5B:
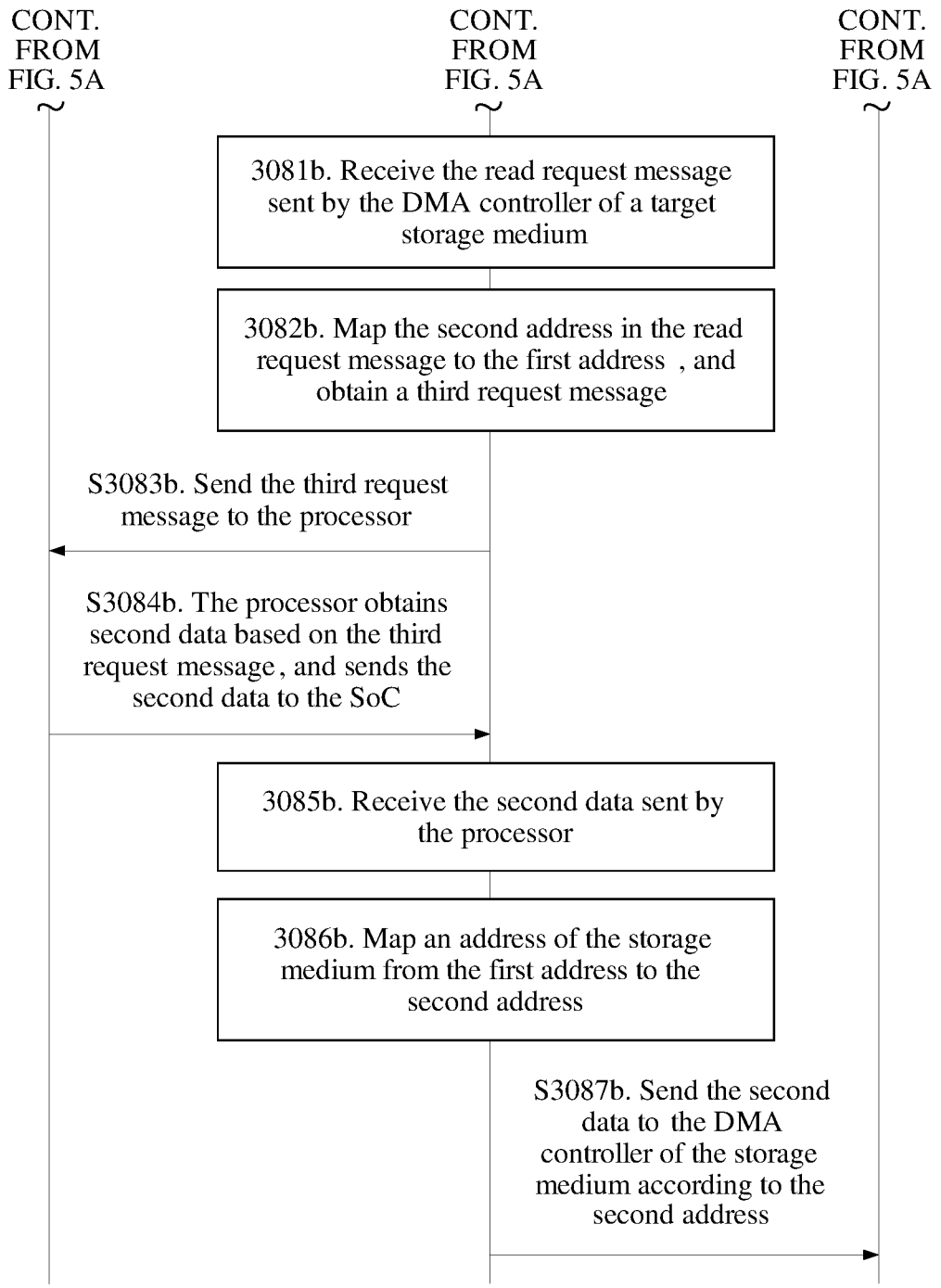

In another possible embodiment, with reference to FIG. 3, FIG. 5A and FIG. 5B show a data transmission process provided in the present application when the operation type is a write operation request. A difference between FIG. 5A and FIG. 5B and FIG. 3 lies in that a specific implementation process of step S308 is described in FIG. 5A and FIG. 5B when the operation request is a write operation request. For a processing process of steps S301 to S307, refer to FIG. 3. Details are not described in this embodiment of the present application again. As shown in FIG. 5A and FIG. 5B, the method provided in this embodiment of the present application includes:

S307b. The DMA controller of the storage medium sends a read request message to the SoC, where the read request message carries the second address.

Specifically, the read request message is used to instruct the processor to send to-be-written second data to the SoC.

S3081b. The SoC receives the read request message sent by the DMA controller of the storage medium.

S3082b. The SoC maps the second address in the read request message to the first address, and generates a third request message, where the third request message is used to instruct the processor to send the second data.

S3083b. The SoC sends the third request message to the processor.

S3084b. The processor sends the second data to the SoC based on the third request message.

S3085b. The SoC receives the second data sent by the processor.

S3086b. The SoC translates the address of the target data from the first address to the second address.

Specifically, the SoC may translate the address of the target data from the first address to the second address by using the preset address mapping table shown in Table 2.

S3087b. The SoC sends the second data to the DMA controller of the storage medium according to the second address, and triggers the DMA controller of the storage medium to obtain the second data in the DMA memory access manner, and store the second data in the storage medium.

Specifically, after receiving the read request message and mapping the second address in the read request message to the first address, the SoC generates the third request message, and sends the third request message to the processor. After receiving the third request message, the processor obtains the second data from the memory of the processor, and sends the second data to the SoC. Then the SoC maps the address of the storage medium to which the second data is to be stored from the first address to the second address. Finally, the DMA controller of the storage medium migrates the second data from the SoC to the storage medium in the DMA memory access manner.

Figure 6:
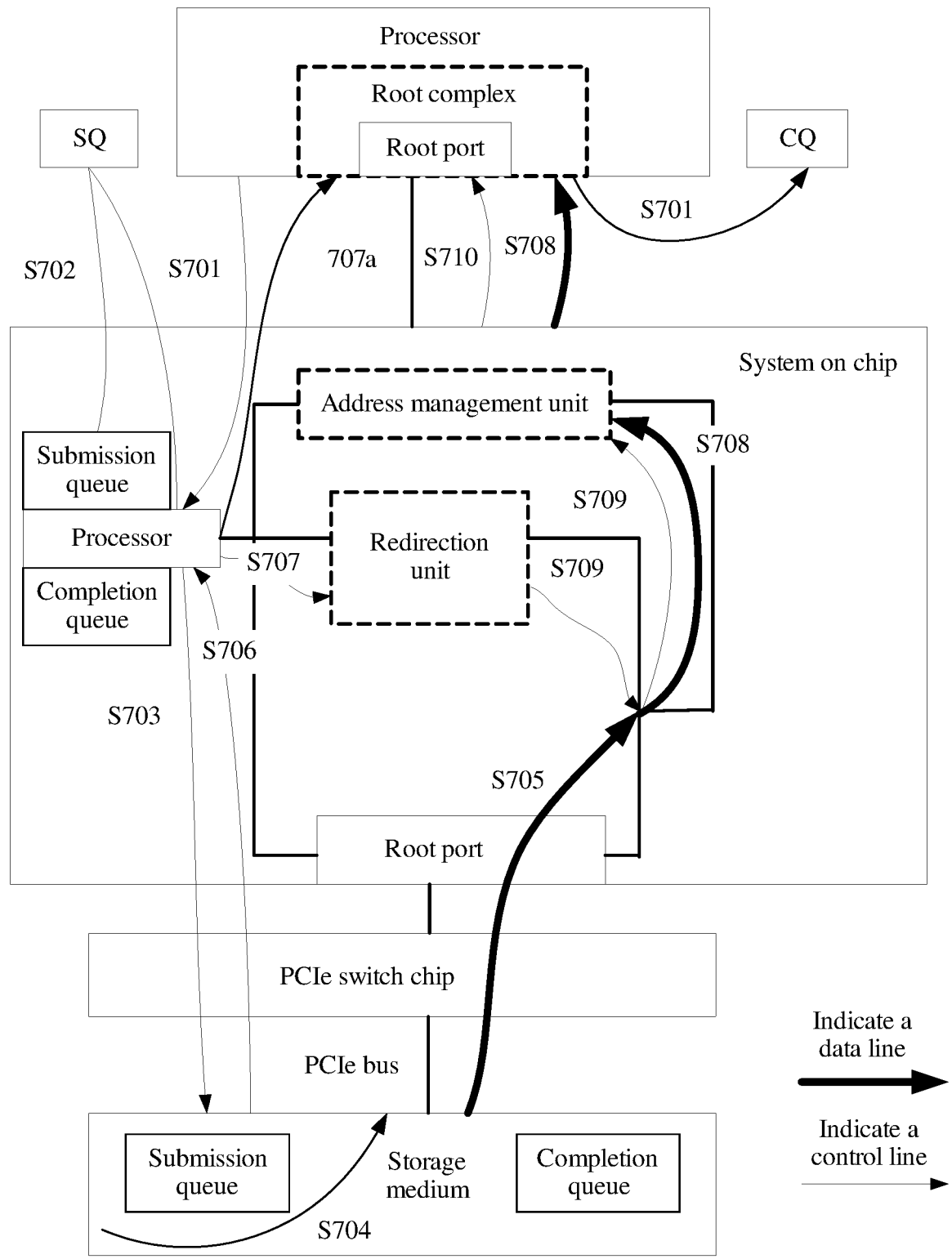
FIG. 6 is a schematic structural diagram of another data transmission method in a case of a read operation request according to an embodiment of the present application.
Figure 7:
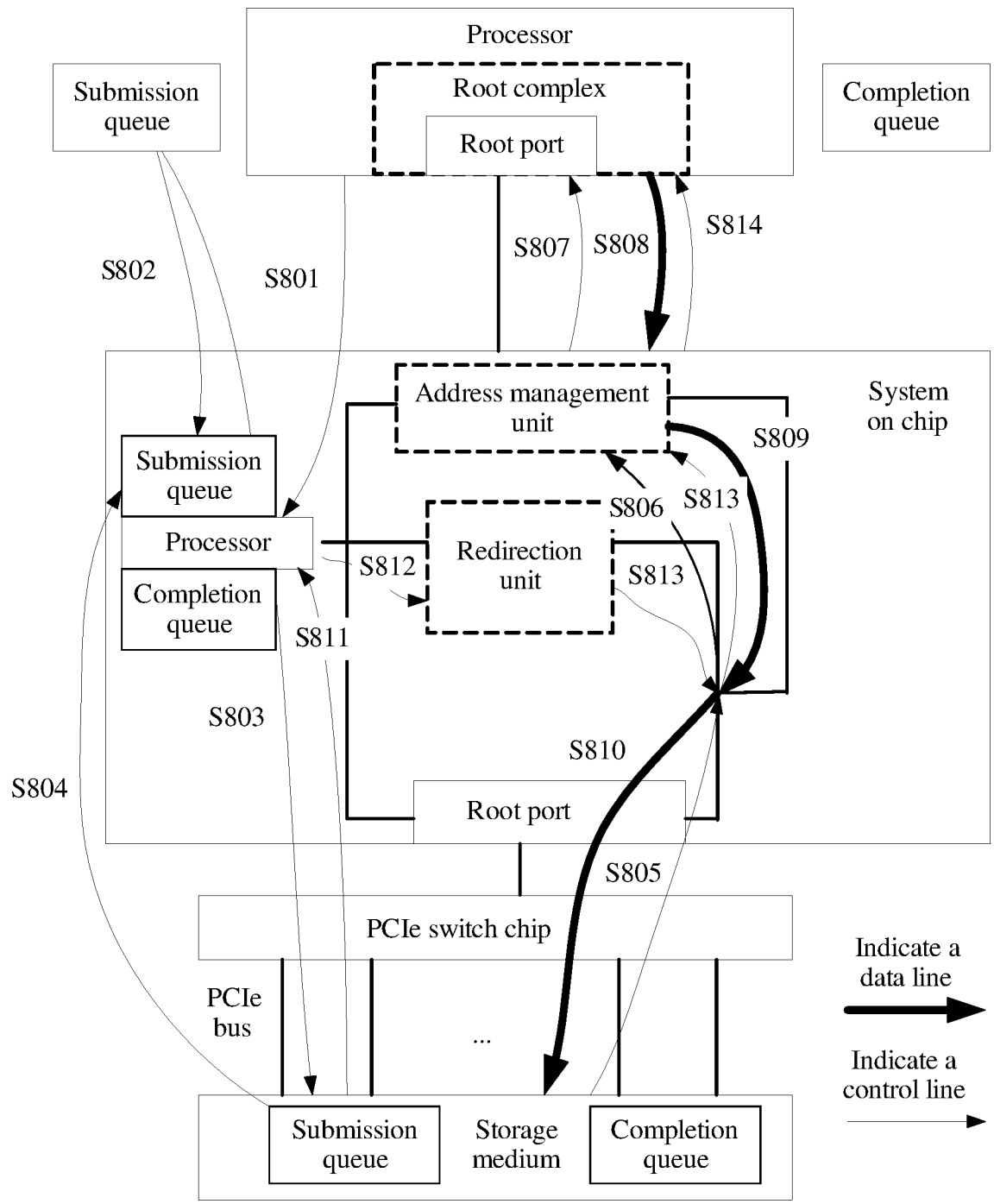
FIG. 7 is a schematic structural diagram of another data transmission method in a case of a write operation request according to an embodiment of the present application.

The following further describes the data transmission method provided in the embodiments of the present application with reference to FIG. 6 and FIG. 7.

FIG. 6 is an architectural diagram of a data transmission process, in a scenario in which an operation type is a read operation request, according to an embodiment of the present application. An SoC includes a processor. The processor is configured to process a read operation or write operation of a processor in a storage system. The SoC further includes a memory address management unit and a redirection unit. The memory address management unit and the redirection unit are computer programs running on the processor. The memory address management unit is configured to map an address of to-be read or to-be-written data. The redirection unit is configured to implement a sorting function in a processing process of the read operation request, so as to implement consistency in the storage system. As shown in FIG. 6, the data transmission method includes the following steps.

S701. The processor sends a second control instruction to the SoC, where the second control instruction is used to instruct the SoC to obtain a read operation instruction carrying a first address (namely, the first request message described in the foregoing embodiment) from a submission queue of the processor.

S702. The SoC obtains the read operation instruction carrying the first address from the submission queue of the processor based on the second control instruction, and maps the first address in the read operation instruction to a second address, so as to generate a second request message carrying the second address and the read operation instruction, and store the second request message in a submission queue of the SoC.

S703. The SoC sends a first control instruction to the storage medium, where the first control instruction is used to instruct a DMA controller of the storage medium of to-be-read or to-be-written data to obtain the second request message from the submission queue of the SoC.

S704. The DMA controller of the storage medium reads first data from the storage medium according to the second address, where the first data is to-be-read data stored in the storage medium.

S705. The DMA controller of the storage medium sends the first data to the SoC by using a transmission link in a DMA memory access manner.

S706. The DMA controller of the storage medium writes, to a CQ of the SoC, an operation instruction that the second address has been read, and sends a first interrupt to a CPU of the SoC.

S707. After receiving the first interrupt, the SoC obtains, from the completion queue of the SoC, an operation instruction that the first data has been read.

It should be noted that in this embodiment of the present application, only after the SoC determines that the first data is completely forwarded to the processor, the first interrupt received by the SoC is processed, and the second interrupt is sent to the processor, so as to ensure that when the processor reads the first data in the storage medium, the first data definitely arrives at the processor earlier than the second interrupt. Specifically, this step may be implemented by using the redirection unit running on the SoC. If there is no redirection unit running on the SoC, the SoC may send the second interrupt to the processor immediately after receiving the first interrupt, that is, step 707*a* in FIG. 6. In this way, a case in which the second interrupt returns to the processor earlier than the target data occurs, consistency on a processor side cannot be ensured, and a data loss may not be avoided.

S708. After mapping an address of the storage medium from the second address to the first address, the SoC forwards the first data to the processor by using a PCIe bus.

S709. The SoC maps the second address to the first address, and obtains a new write-back instruction, where the new write-back instruction is used to indicate the operation instruction that the first data has been read.

S710. After determining that the first data is completely forwarded to the processor, the SoC writes, to a completion queue of the processor, the operation instruction that the first address has been read, and sends the second interrupt to the processor.

S711. After receiving the second interrupt, the processor reads, from the completion queue of the processor, the operation instruction that the first address has been read, so as to determine that the first data has been successfully read from the storage medium.

FIG. 7 is a diagram of a data transmission architecture, in a scenario in which an operation type is a write operation request, according to an embodiment of the present application. As shown in FIG. 7, the data transmission method includes the following steps.

S801. A processor sends a second control instruction to an SoC, where the second control instruction is used to instruct the SoC to obtain an instruction a write operation from a submission queue of the processor, and the write operation instruction is used to instruct to write second data in a memory of the processor to the storage medium.

S802. The SoC obtains the instruction the write operation from the submission queue of the processor, maps, to a second address, a first address of the storage medium of to-be-written data in the write operation instruction, and generates, in a submission queue of the SoC, a second request message carrying the second address and an operation type.

S803. The SoC sends a first control instruction to a DMA controller of the storage medium, where the first control instruction is used to instruct the DMA controller of the storage medium to obtain the second request message carrying the second address and the operation type from the submission queue of the SoC.

S804. The DMA controller of the storage medium obtains the second request message carrying the second address and the operation type from the submission queue of the SoC based on the first control instruction.

Specifically, the storage medium processes the second request message, carrying the second address and the operation type, obtained from the submission queue of the SoC, generates a read request message, where the request message includes the second address and the operation type, and stores the read request message in a submission queue of the storage medium.

S805. The DMA controller of the storage medium sends a read request message carrying the second address and the operation type to the SoC.

S806. The SoC maps the second address in the read request message carrying the second address and the operation type to the first address.

S807. The SoC sends, by using a PCIe bus, a read request message carrying the first address to the processor.

S808. After receiving the read request message carrying the first address, the processor sends the second data and the first address to the SoC.

S809. The SoC maps the first address to the second address, and then sends the second data to the DMA controller of the storage medium according to the second address.

S810. The DMA controller of the storage medium migrates the second data from the SoC to the storage medium.

S811. The DMA controller of the storage medium writes, to a CQ of the SoC, an instruction that the second data has been written to the storage medium, and sends a first interrupt to the SoC.

S812. After receiving the first interrupt, the SoC obtains, from the CQ of the SoC, the instruction that the second data has been written to the storage medium.

S813. The SoC maps the second address to the first address, so as to obtain a new CQ write-back instruction.

S814. The SoC writes the new CQ write-back instruction to a CQ of the processor, and sends a second interrupt to the processor.

It may be understood that, in this embodiment of the present application, when the operation type is write, steps S811 to S814 may be omitted.

When the data transmission method provided in the embodiment of the present application is applied to the architecture shown in FIG. 2A or FIG. 2B, the processor performs functions such as reading data in the storage medium by using the SoC, writing data to the storage medium by using the SoC, or offloading a RAID. Data exchange between the processor and the storage medium is directly performed (that is, the processor directly connects to a storage device). The data does not need to be copied to a DDR on which the SoC is mounted any more, and is directly migrated to the storage medium. In the following, a processing process used when the storage medium is an SSD is used as an example to provide further description.

(1) In a RAID0 mode, when the processor reads/writes target data, only one DMA operation is used. The data is directly communicated between the processor and the SSD. No calculation is performed, but only data copying is performed.

(2) In a RAID1 mode, when the processor reads/writes target data, only one DMA operation is used. The data is directly communicated between the processor and the SSD.

(3) In a RAID10 mode, when the processor reads/writes target data, only one DMA operation is used. The data is directly communicated between a host and the SSD.

(4) In a RAID5 mode, when the processor reads the target data from the SSD, only one DMA operation is used. The data is directly migrated from the SSD to the processor by using a DMA controller of the SSD. When the processor writes the target data to the SSD, a write operation requires data calculation, and the data is then written to the disk. Check information is written to the disk. Therefore, the data needs to enter the SoC.

(5) In a RAID6 mode, when the processor reads the target data from the SSD, only one DMA operation is used. The data is directly copied from the SSD to the processor. When the processor writes the target data to the SSD, the data needs to be calculated, and the data needs to enter the SoC.

The data transmission method provided in this embodiment of the present application may be applied to a RAID mode (which is not limited to the foregoing several cases) without participation of the SoC in calculation, the SoC only needs to map, to the second address, the first address in a read or write operation request sent by the processor, or maps the second address to the first address, so that the DMA controller of the storage medium can identify the first address or the second address. Therefore, during transmission between the storage medium and the processor, the SoC completes only request processing and forwarding, and address mapping. A process of migrating data from the processor to the storage medium or from the storage medium to the processor is performed only by the DMA controller of the storage medium, and the DMA controller of the SoC does not need to participate in migration. In this way, a bandwidth utilization ratio is increased, and the SoC does not participate in DMA migration. Therefore, an SoC performance bottleneck is avoided. In addition, an input/output per second (IOPS) capability may be stacked by using SSD linear stacking, so that performance of the storage system is significantly improved.

Figure 8A:
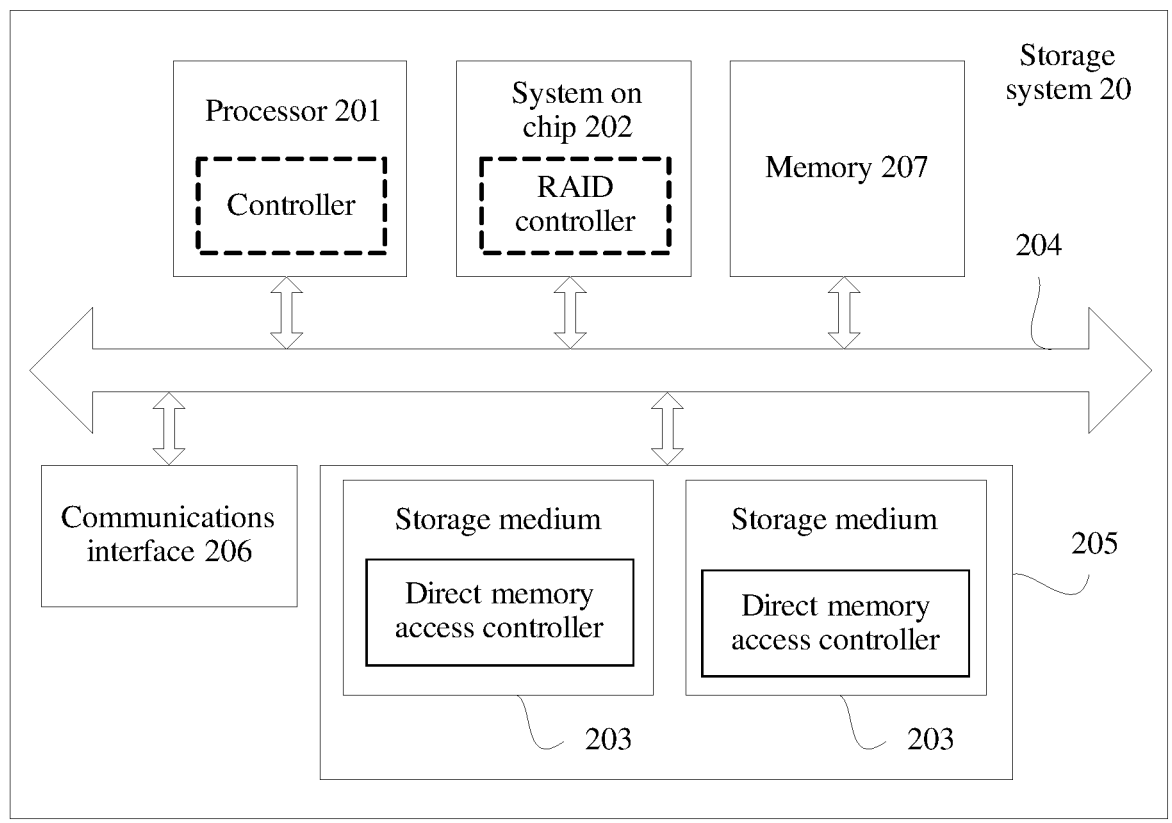
FIG. 8A is a schematic structural diagram of a storage system according to an embodiment of the present application.

FIG. 8A is a schematic structural diagram of a storage system according to an embodiment of the present application. The storage system shown in FIG. 8A is a storage array. As shown in FIG. 8A, the storage system 20 may include a processor 201, a system on chip 202, a storage medium 203, a communications interface 206, and a memory 207. The processor 201, the system on chip 202, the storage medium 203, the communications interface 206, and the memory 207 are connected by using a communications bus 204. The processor 201 includes a controller, the system on chip 202 includes a RAID controller, and the storage medium 203 includes a DMA controller. In the storage system shown in FIG. 8A, the storage medium 203 may be one or more storage media in a same physical device as the processor 201, or may be one or more storage media connected, by using a disk enclosure 205, to a physical device on which the controller is located.

The processor is configured to send, to the SoC, a first control instruction used to obtain a first request message, where the first control instruction carries an identifier used to uniquely identify the first request message, the first request message includes a first address of the storage medium and an operation type, and the first address is an address assigned by the processor to the storage medium in a memory address managed by the processor.

The SoC is configured to: receive the first control instruction sent by the processor, and obtain the first request message based on the first control instruction; determine a second address based on the first address and generate a second request message, where the second address is an address assigned by the SoC to the storage medium in a memory address managed by the SoC, and the second request message carries the second address and the operation type; send the first control instruction to the DMA controller of the storage medium according to the second address, where the first control instruction is used to instruct the DMA controller to obtain the second request message; and when the operation type is a read operation, receive first data sent by the DAM controller, and send the first data to the processor, where the first data is obtained by the DMA controller according to the second address; or when the operation type is a write operation, receive second data sent by the processor, and send the second data to the DMA controller to trigger the DMA controller to write the second data to the storage medium according to the second address.

The DMA controller of the storage medium is configured to: receive a second control instruction, where the second control instruction carries the identifier used to uniquely identify the first request message; obtain the second request message based on the second control instruction; and when the operation type is a read operation, obtain the first data according to the second address, and send the first data to the SoC; or when the operation type is a write operation, receive the second data sent by the SoC, and write the second data to the storage medium according to the second address.

The communications interface 206 is used for communication between the storage system and another device.

The memory 207 is configured to store a program. The memory 207 may include a high-speed RAM memory, and may further include a non-volatile memory, for example, at least one magnetic disk memory. It may be understood that the memory may be various non-transitory machine-readable media capable of storing program code, for example, a random-access memory (RAM), a hard disk, an optical disc, an SSD, or the non-volatile memory.

The processor 201 may be a CPU, or the processor 201 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor or the processor may be any conventional processor, or the like. The processor is configured to perform the operation steps, performed by the processor as an execution body, in FIG. 3 to FIG. 7 in the foregoing embodiments.

The DMA controller of the storage medium is configured to perform the operation steps, performed by the DMA controller of the storage medium as an execution body, in FIG. 3 to FIG. 7 in the embodiments.

It should be noted that in FIG. 8A, there may be one or more processors, and there may also be one or more storage media.

Figure 8B:
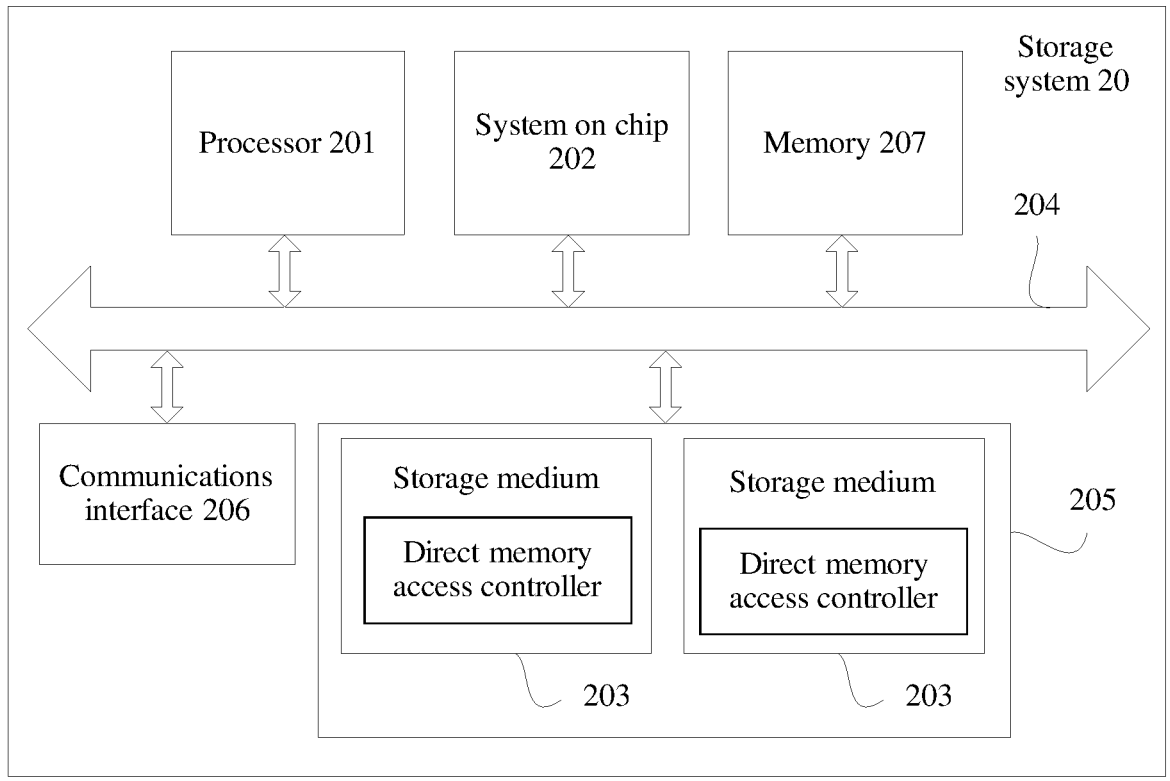
FIG. 8B is a schematic structural diagram of another storage system according to an embodiment of the present application.

FIG. 8B is a schematic structural diagram of another storage system 20 according to an embodiment of the present application. The storage system shown in FIG. 8B is a storage device, for example, a server. A difference between FIG. 8B and FIG. 8A lies in that, in FIG. 8B, there is no controller in a processor 201 and no RAID controller on an SoC. Specifically, functions of various hardware structures shown in FIG. 8B are the same as functions of hardware structures shown in FIG. 8A. Details are not described in this embodiment of the present application again.

The storage system shown in FIG. 8A is a schematic structural diagram used when an architecture of the storage system shown in FIG. 2A is a storage array. The storage system shown in FIG. 8B is a schematic structural diagram used when an architecture of the storage system shown in FIG. 2A is a storage device.

The foregoing mainly describes the solutions provided in the embodiments of the present application from the perspective of the SoC. It may be understood that, to implement the foregoing functions, the SoC includes a corresponding hardware structure and/or software module for performing each of the functions. A person of ordinary skill in the art should be easily aware that, the units and algorithm steps in the examples described with reference to the embodiments disclosed in this specification may be implemented by hardware or a combination of hardware and computer software. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present application.

In this embodiment of the present application, functional modules of the SoC may be divided based on the foregoing method example. For example, each function module may be divided according to each function, or two or more functions may be integrated into one processing module. The integrated module may be implemented in a form of hardware, or may be implemented in a form of a functional module of software. It should be noted that the module division in the embodiments of the present application is an example, and is merely logical function division. There may be another division manner in an actual implementation.

Figure 9A:
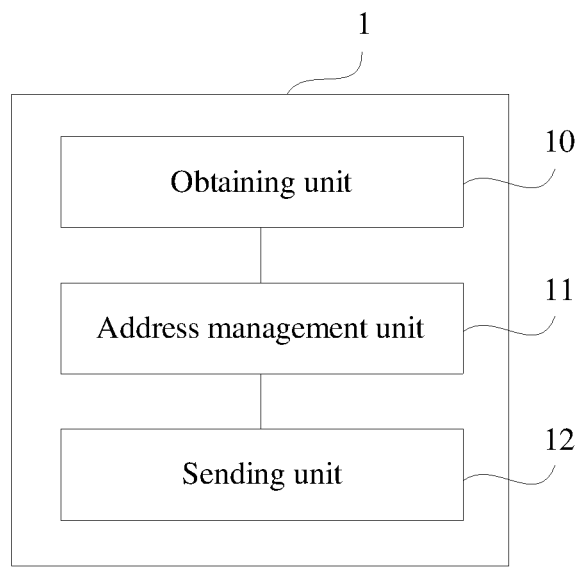
FIG. 9A is a schematic structural diagram of a system on chip according to an embodiment of the present application.

When each function module is obtained through division for each corresponding function, FIG. 9A is a possible schematic structural diagram of the SoC in the foregoing embodiment. An SoC1 includes an obtaining unit 10, an address management unit 11, and a sending unit 12.

The obtaining unit 10 is configured to: obtain a first request message, where the first request message includes a first address of the storage medium and an operation type, the operation type includes a read operation or a write operation, and the first address is an address assigned by the processor to the storage medium in a memory address managed by the processor; and when the operation type is a read operation, receive, by the SoC, first data sent by the DAM controller, and the first data is obtained by the DMA controller according to the second address; or when the operation type is a write operation, receive second data sent by the processor.

The address management unit 11 is configured to determine a second address of the storage medium based on the first address and generate a second request message, where the second address is an address assigned by the SoC to the storage medium in a memory address managed by the SoC, and the second request message carries the second address and the operation type.

The sending unit 12 is configured to: send a first control instruction to the DMA controller of the storage medium according to the second address, where the first control instruction is used to instruct the DMA controller to obtain the second request message; send the first data to the processor; and send the second data to the DMA controller to trigger the DMA controller to write the second data to the storage medium according to the second address.

Figure 9B:
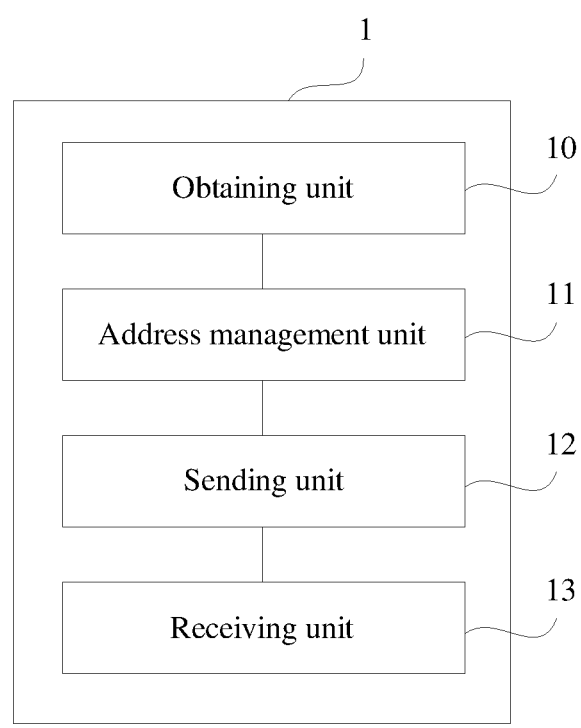
FIG. 9B is a schematic structural diagram of another system on chip according to an embodiment of the present application.

Optionally, as shown in FIG. 9B, the SoC in this embodiment of the present application further includes a receiving unit 13 configured to: receive a second control instruction sent by the processor, where the second control instruction carries an identifier used to uniquely identify the first request message; and obtain the first request message based on the identifier of the first request message.

Optionally, that the address management unit 11 in the SoC in this embodiment of the present application is especially configured to: obtaining a second address corresponding to the first address from a preset address mapping table according to the first address, where the preset address mapping table includes at least a mapping relationship between the address assigned to the storage medium in the memory address managed by the processor and the address assigned to the storage medium in the memory address managed by the SoC; and determining the address corresponding to the first address as the second address of the storage medium.

Optionally, the receiving unit 13 in the SoC in this embodiment of the present application is further configured to: when the operation type is a read operation request, receive the first data sent by the DMA controller.

The address management unit 11 is further configured to map the second address of the storage medium to the first address according to the preset address mapping table.

The sending unit 12 is further configured to forward the first data to the processor according to the first address.

Figure 9C:
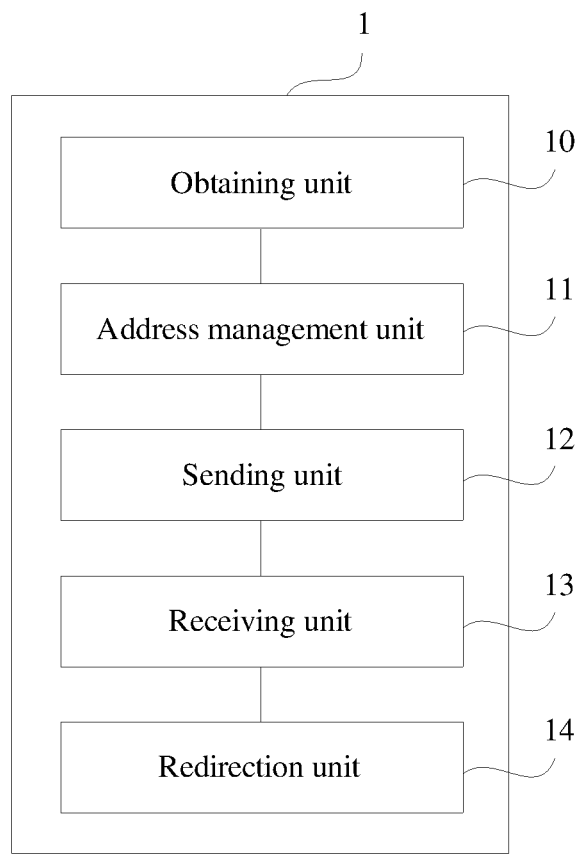
FIG. 9C is a schematic structural diagram of another system on chip according to an embodiment of the present application.

Optionally, as shown in FIG. 9C, the SoC in this embodiment of the present application further includes a redirection unit 14.

The receiving unit 13 is further configured to receive a first interrupt sent by the DMA controller, where the first interrupt is used to indicate that the DMA controller has successfully transmitted the first data to the SoC.

The redirection unit 14 is configured to: when the SoC determines that the SoC successfully transmits the first data to the processor according to the first address, send a second interrupt to the processor, where the second interrupt is used to indicate that the SoC successfully forwards the first data to the processor.

Optionally, the receiving unit 13 in this embodiment of the present application is further configured to: when the operation type is a write operation request, receive the second data sent by the processor.

The address management unit 11 is further configured to map the first address of the storage medium to the second address.

The sending unit 12 is further configured to send the second data to the DMA controller according to the second address.

Optionally, the receiving unit 13 is further configured to: before receiving the second data sent by the processor, receive a read request message sent by the DMA controller, where the read request message carries the second address.

The address management unit 11 is further configured to: map the second address in the read request message to the first address, and generate a third request message, where the third request message is used to instruct the processor to send the second data to the SoC.

The sending unit 12 is further configured to send the third request message to the processor.

The SoC1 in FIG. 9A according to this embodiment of the present application may correspondingly perform the method described in the embodiment of the present application. In addition, the foregoing and other operations and/or functions of the units in the SoC1 are separately intended to implement corresponding processes using the SoC as the execution body in the methods in FIG. 3 to FIG. 7. For brevity, details are not described herein.

Figure 9D:
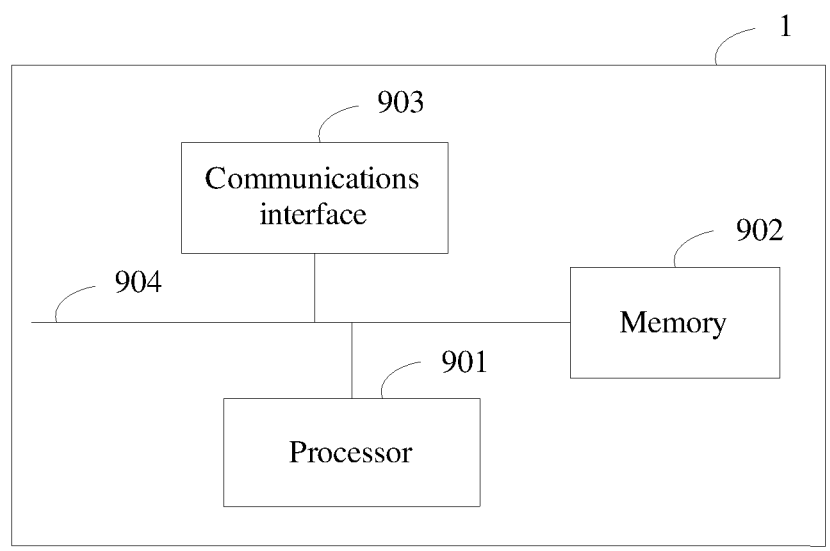
FIG. 9D is a schematic structural diagram of hardware of a system on chip according to an embodiment of the present application.

FIG. 9D is a schematic structural diagram of hardware of an SoC according to an embodiment of the present application. As shown in FIG. 9D, the SoC includes a processor 901, a memory 902, a communications interface 903, and a bus 904. The processor 901, the memory 902, and the communications interface 903 are interconnected by using the bus 904 to implement mutual communication. The memory 902 is configured to store a computer execution instruction. When the SoC runs, the processor 901 executes the computer execution instruction in the memory 902 to perform the following steps by using a hardware resource in the SoC: obtaining a first request message, where the first request message includes a first address of the storage medium and an operation type, the operation type includes a read operation or a write operation, and the first address is an address assigned by the processor to the storage medium in a memory address managed by the processor; determining a second address of the storage medium based on the first address and generating a second request message, where the second address is an address assigned by the SoC to the storage medium in a memory address managed by the SoC, and the second request message carries the second address and the operation type; sending a first control instruction to a DMA controller of the storage medium according to the second address, where the first control instruction is used to instruct the DMA controller to obtain the second request message; and receiving, when the operation type is a read operation, first data sent by the DAM controller, and sending the first data to the processor, where the first data is obtained by the DMA controller according to the second address; or receiving, when the operation type is a write operation, second data sent by the processor, and sending the second data to the DMA controller to trigger the DMA controller to write the second data to the storage medium according to the second address.

For example, the processor 901 maybe a CPU, a general-purpose processor, a DSP, an ASIC, an FPGA, or another programmable logic device, a transistor logic device, a hardware component, or any combination thereof. It may implement or execute various examples of logical blocks, modules, and circuits that are described with reference to the contents disclosed in the present application. The processor may also be a combination of computing functions, for example, a combination of one or more microprocessors or a combination of a DSP and a microprocessor.

The bus 904 may be a Peripheral Component Interconnect (PCI) bus or an Extended Industry Standard Architecture (EISA) bus, or the like. The bus may be categorized as an address bus, a data bus, a control bus, or the like. For ease of indication, the bus is indicated by using only one bold line in FIG. 9D. However, it does not indicate that there is only one bus or only one type of bus.

It should be understood that the SoC according to this embodiment of the present application is corresponding to a functional apparatus of the SoC in FIG. 9B provided in the embodiment of the present application. The SoC is configured to implement corresponding processes of the methods shown in FIG. 3 to FIG. 7. For brevity, details are not described herein.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded or executed on the computer, the procedures or functions according to the embodiments of the present application are all or partially generated. The computer may be a general-purpose computer, a dedicated computer, a computer network, or another programmable apparatus. The computer instructions may be stored in a computer-readable medium or may be transmitted from a computer-readable storage medium to another computer-readable storage medium. For example, the computer instructions may be transmitted from a website, computer, server, or data center to another website, computer, server, or data center in a wired (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, an SSD), or the like.

In the several embodiments provided in this application, it should be understood that the disclosed system, apparatus, and method may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

The foregoing descriptions about implementations allow a person skilled in the art to understand that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein.

The foregoing descriptions are merely specific embodiments of this application, but are not intended to limit the protection scope of this application. Any variation or replacement disclosed in this application shall fall within the protection scope of this application. Therefore, the protection scope of this application shall be subject to the protection scope of the claims.

What is claimed is:

1. A data transmission method implemented by a system on chip (SoC), the data transmission method comprising:
   obtaining a first request, wherein the first request comprising a first address of a storage medium and an operation type, wherein the first address is assigned by a processor to the storage medium in a first memory address managed by the processor;
   identifying, according to the first address, a second address assigned by the SoC to the storage medium in a second memory address managed by the SoC;
   generating a second request comprising the second address and the operation type; and
   sending, to a direct memory access (DMA) controller of the storage medium and according to the second address, a first control instruction instructing the DMA controller to obtain the second request.

2. The data transmission method of claim 1, when the operation type is a read operation, and wherein the method further comprises:
receiving, from the DMA controller, first data obtained according to the second address; and
sending the first data to the processor.

3. The data transmission method of claim 1, wherein when the operation type is a write operation, the method further comprises:
receiving second data from the processor; and
sending the second data to the DMA controller to trigger the DMA controller to write the second data to the storage medium according to the second address.

4. The data transmission method of claim 1, wherein before obtaining the first request, the method further comprises receiving, from the processor, a second control instruction carrying an identifier identifying the first request, and wherein obtaining the first request comprises obtaining the first request message based on the identifier.

5. The data transmission method of claim 1, further comprising:
obtaining from a preset address mapping table and according to the first address, a third address corresponding to the first address, wherein the preset address mapping table comprises a mapping relationship between the first address and the second address; and
determining the that the third address is the second address.

6. The data transmission method of claim 1, further comprising:
receiving the first data from the DMA controller;
mapping the second address to the first address according to a preset address mapping table; and
forwarding the first data to the processor according to the first address.

7. The data transmission method of claim 6, further comprising:
receiving from the DMA controller, a first interrupt indicating that the DMA controller has transmitted the first data to the SoC; and
sending, to the processor in response to forwarding the first data to the processor, a second interrupt indicating the forwarding.

8. The data transmission method of claim 1, further comprising:
receiving second data from the processor;
mapping the first address to the second address; and
sending the second data to the DMA controller according to the second address.

9. The data transmission method of claim 8, wherein before receiving the second data, the method further comprises:
receiving from the DMA controller, a read request message carries carrying the second address;
mapping the second address to the first address;
generating a third request message instructing the processor to send the second data to the SoC; and
sending the third request message to the processor.

10. A system on chip (SoC) comprising:
a storage medium; and
a first processor coupled to the storage medium and configured to:
manage a first memory address;
assign a first address to the storage medium in the first memory address;
obtain a first request comprising the first address of the storage medium and an operation type;
identify, according to the first address, a second address assigned by the SoC to the storage medium in a second memory address managed by the SoC;
generate a second request comprising the second address and the operation type; and
send to a direct memory access (DMA) controller of the storage medium and according to the second address, a first control instruction instructing the DMA controller to obtain the second request.

11. The SoC of claim 10, wherein when the operation type is a read operation, the first processor is further configured to:
receive, from the DMA controller, first data obtained according to the second address; and
send the first data to a second processor, wherein the second processor is coupled to the SoC using an extended Peripheral Component Interconnect Express (PCIe) communication bus.

12. The SoC of claim 10, wherein when the operation type is a write operation, the first processor is further configured to:
receive second data from a second processor; and
send the second data to the DMA controller to trigger the DMA controller to write the second data to the storage medium according to the second address.

13. The SoC of claim 10, wherein the first processor is further configured to:
receive, before obtaining the first request, a second control instruction carrying an identifier used to identifying the first request; and
obtain the first request based on the identifier.

14. The SoC of claim 10, wherein the first processor is further configured to:
obtain, from a preset address mapping table and according to the first address, a third address corresponding to the first address, wherein the preset address mapping table comprises a mapping relationship between the first address and the second address; and
determine that the third address is the second address.

15. The SoC of claim 10, wherein the first processor is further configured to:
receive first data from the DMA controller;
map the second address to the first address according to a preset address mapping table; and
forward the first data to a second processor according to the first address.

16. The SoC of claim 15, wherein the first processor is further configured to:
receive, from the DMA controller, a first interrupt indicating that the DMA controller has transmitted the first data to the SoC; and
send, to the second processor in response to forwarding the first data to the second processor, a second interrupt indicating the forwarding.

17. The SoC of claim 10, wherein the first processor is further configured to:
receive second data from a second processor;
map the first address to the second address; and
send the second data to the DMA controller according to the second address.

18. The SoC of claim 17, wherein the first processor is further configured to:
receive, from the DMA controller, a read request message carrying the second address;
map the second address to the first address;

generate a third request message instructing a second processor to send the second data to the SoC; and send the third request message to the second processor.

19. A computer program product comprising computer-executable instructions for storage on a non-transitory computer-readable medium that, when executed by a first processor, cause a system on chip (SoC) to:

manage a first memory address;

assign a first address to a storage medium in the first memory address;

obtain a first request comprising the first address of the storage medium and an operation type;

identify, according to the first address, a second address assigned by the SoC to the storage medium in a second memory address managed by the SoC;

generate a second request comprising the second address and the operation type; and send, to a direct memory access (DMA) controller of the storage medium and according to the second address, a first control instruction instructing the DMA controller to obtain the second request.

20. The computer program product of claim 19, wherein the instructions further cause the SoC to:

receive, from a second processor, a second control instruction carrying an identifier identifying the first request, wherein the second processor is coupled to the SoC using an extended Peripheral Component Interconnect Express (PCIe) communication bus; and obtain the first request based on the identifier.

* * * * *

UNITED STATES PATENT AND TRADEMARK OFFICE
CERTIFICATE OF CORRECTION

PATENT NO. : 10,810,135 B2
APPLICATION NO. : 16/523771
DATED : October 20, 2020
INVENTOR(S) : Hao Chen, Sicong Li and Yajun Chen It is certified that error appears in the above-identified patent and that said Letters Patent is hereby corrected as shown below:

In the Claims

Claim 1, Column 22, Line 54: "request, wherein the first request comprising" should read "request, comprising"

Claim 5, Column 23, Line 22: "obtaining from a" should read "obtaining, from a"

Claim 9, Column 23, Line 53: "receiving from the" should read "receiving, from the"

Claim 9, Column 23, Line 54: "carries carrying the" should read "carrying the"

Claim 10, Column 24, Line 6: "send to a" should read "send, to a"

Claim 13, Column 24, Line 30: "identifier used to identifying" should read "identifier identifying"

Signed and Sealed this
First Day of December, 2020

Andrei Iancu
*Director of the United States Patent and Trademark Office*